United States Patent
Liu et al.

(10) Patent No.: US 12,204,709 B2
(45) Date of Patent: Jan. 21, 2025

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Liwang Liu, Wuhan (CN); Weihong Yin, Wuhan (CN); Chao Wang, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/998,977

(22) PCT Filed: Nov. 4, 2022

(86) PCT No.: PCT/CN2022/129830
§ 371 (c)(1),
(2) Date: Nov. 16, 2022

(87) PCT Pub. No.: WO2024/060363
PCT Pub. Date: Mar. 28, 2024

(65) Prior Publication Data
US 2024/0272734 A1     Aug. 15, 2024

(30) Foreign Application Priority Data
Sep. 21, 2022   (CN) .......................... 202211152849.1

(51) Int. Cl.
*G06F 3/041*     (2006.01)
*G09G 3/20*      (2006.01)

(52) U.S. Cl.
CPC ........ *G06F 3/0412* (2013.01); *G06F 3/04164* (2019.05); *G09G 3/20* (2013.01);
(Continued)

(58) Field of Classification Search
CPC .............. G06F 3/0412; G06F 3/04164; G06F 3/04184; G09G 3/20; G09G 2300/0426;
(Continued)

(56) References Cited

U.S. PATENT DOCUMENTS 7,714,826 B2 * 5/2010 Jang .................... G09G 3/3688
                                                   345/98
10,654,745 B2 * 5/2020 Mitra ........................ C03C 4/20
(Continued)

FOREIGN PATENT DOCUMENTS

CN        105549792 A       5/2016
CN        107039467 A       8/2017
(Continued)

OTHER PUBLICATIONS

International Search Report in International application No. PCT/CN2022/129830, mailed on May 31, 2023.
(Continued)

*Primary Examiner* — Grant Sitta (57) ABSTRACT

The present application provides a display panel and a display device. The display panel includes a plurality of data lines and a first demultiplexer. In the first demultiplexer, each first channel wire is connected to at least two data lines. Each first control unit includes a plurality of first switching elements. At least one data line is connected to the first channel wire through M first switching elements connected in parallel, and M≥2. The display panel includes a display area, and the first control unit is arranged in the display area.

18 Claims, 8 Drawing Sheets

(52) U.S. Cl.
CPC . *G06F 3/04184* (2019.05); *G09G 2300/0426* (2013.01); *G09G 2310/0297* (2013.01); *G09G 2354/00* (2013.01)

(58) Field of Classification Search
CPC ....... G09G 2310/0297; G09G 2354/00; G09G 3/3648; G09G 3/3614; G09G 3/3688; G09F 9/30
See application file for complete search history.

(56) References Cited

U.S. PATENT DOCUMENTS

| | | | | |
|---|---|---|---|---|
| 10,732,752 | B1* | 8/2020 | Zhu | G06F 3/0416 |
| 2005/0140666 | A1* | 6/2005 | Shin | G09G 3/3283 |
| | | | | 345/211 |
| 2018/0330653 | A1* | 11/2018 | Zhou | H01L 27/124 |
| 2018/0336809 | A1* | 11/2018 | Xi | G09G 3/20 |
| 2019/0189059 | A1* | 6/2019 | Na | G09G 3/3225 |
| 2020/0184900 | A1* | 6/2020 | Shin | G09G 3/3233 |
| 2020/0380927 | A1* | 12/2020 | Ai | G09G 3/3614 |
| 2021/0104192 | A1* | 4/2021 | Huang | G09G 3/20 |
| 2021/0357096 | A1* | 11/2021 | Jiang | G06F 3/04166 |
| 2022/0208124 | A1 | 6/2022 | Choi et al. | |

FOREIGN PATENT DOCUMENTS

| | | |
|---|---|---|
| CN | 109887458 A | 6/2019 |
| CN | 111752413 A | 10/2020 |
| CN | 113282187 A | 8/2021 |
| CN | 114115606 A | 3/2022 |
| CN | 114637147 A | 6/2022 |

OTHER PUBLICATIONS

Written Opinion of the International Search Authority in International application No. PCT/CN2022/129830, mailed on May 31, 2023.

* cited by examiner

DISPLAY PANEL AND DISPLAY DEVICE

FIELD OF INVENTION

The present application relates to a field of display technology, in particular, to a display panel and a display device.

DESCRIPTION OF PRIOR ART

Displays with a narrow border have advantages of simplicity, beauty, and high screen ratio and have gradually become a major development trend of high-end displays. At present, developments of narrow border technology are approaching bottleneck, and it is particularly difficult to further reduce border of a display panel and improve product specification.

Referring to prior art, a gate driving circuit, a driving chip, a flexible printed circuit border, a demultiplexer (Demux) circuit, power supply wires, touch circuit wires, etc. are required to be arranged in a border area of the display panel, which makes it difficult to shrink the border of the display panel, and is not conducive to achieving narrow border.

SUMMARY

The present application provides a display panel and a display device to solve a technical problem that it is difficult to reduce a border of a display panel in the prior art, which is not conducive to achieving narrow border.

The present application provides a display panel, including:
- a plurality of data lines, wherein the plurality of data lines are arranged at intervals along a first direction;
- a first demultiplexer, wherein the first demultiplexer includes a first control unit and a first channel wire, an extending direction of the first channel wire and an extending direction of the data lines are same, the first channel wire is connected to at least two of the data lines, the first control unit includes a plurality of first switching elements, one of the at least two data lines sharing the same first channel wire is connected to the first channel wire through M first switching elements connected in parallel, and M≥2; and
- wherein the display panel further includes a display area, and the first control unit is disposed in the display area.

Optionally, in some embodiments of the present application, the first demultiplexer further includes at least two control lines, the at least two control lines are arranged at intervals along the extending direction of the data lines, the at least two control lines are configured to transmit different control signals, and the M first switching elements connected to the same data line are all connected to a same one of the at least two control lines.

Optionally, in some embodiments of the present application, the first demultiplexer further includes a plurality of control lines, and the plurality of control lines are arranged at intervals along the extending direction of the data lines; and
- wherein M control lines are configured to transmit a same control signal, and the M first switching elements connected to the same data line are connected to the M control lines configured to transmit the same control signal in one-to-one correspondence.

Optionally, in some embodiments of the present application, the display panel further includes a plurality of sub-pixels arranged in an array, the plurality of first switching elements are disposed in different sub-pixels, and each row of the sub-pixels is provided with at most one of the control lines.

Optionally, in some embodiments of the present application, data voltage polarities of the data lines connected to the same first channel wire are same.

Optionally, in some embodiments of the present application, the display panel further includes one pixel area, along the first direction, the pixel area includes 2N columns of sub-pixels, the pixel area is provided with two of the first channel wires, each column of the 2N columns of sub-pixels is correspondingly provided with one of the data lines, and N is an integer greater than or equal to 2: and
- wherein the data voltage polarities of two adjacent first channel wires are opposite, in the pixel area, a first one of the two adjacent first channel wires is respectively connected to odd-numbered data lines along the first direction, and a second one of the two adjacent first channel wires is respectively connected to even-numbered data lines.

Optionally, in some embodiments of the present application, the display panel further includes a plurality of columns of sub-pixels, data voltage polarities of two adjacent columns of the sub-pixels are opposite, and data voltage polarities of two adjacent first channel wires are opposite: and
- wherein one auxiliary channel wire is disposed between the two adjacent first channel wires, and the first switching elements connected to the auxiliary channel wire is disposed in the sub-pixels adjacent to the auxiliary channel wire.

Optionally, in some embodiments of the present application, the display panel further includes one pixel area, the pixel area includes six columns of sub-pixels, the pixel area is provided with four of the first channel wires, and each column of the sub-pixels is correspondingly provided with one of the data lines; and
- wherein in the pixel area along the first direction, a first one of the four of the first channel wires is connected to a first one of the data lines and a third one of the data lines respectively, a second one of the four of the first channel wires is connected to a second one of the data lines, a third one of the four of the first channel wires is connected to a fourth one of the data lines and a sixth one of the data lines respectively, a fourth one of the four of the first channel wires is connected to a fifth one of the data lines, and the second one of the four of the first channel wires and the fourth one of the four of the first channel wires are both auxiliary channel wires.

Optionally, in some embodiments of the present application, the first one of the four of the channel wires is connected in parallel with the fourth one of the four of the channel wires, and the second one of the four of the channel wires is connected in parallel with the third one of the four of the channel wires.

Optionally, in some embodiments of the present application, the display panel further includes one pixel area, along the first direction, the pixel area includes N columns of sub-pixels, the pixel area is provided with one of the first channel wires, and N is an integer greater than or equal to 2; and
- wherein in the pixel area, the first channel wire is respectively connected to the data lines corresponding to each column of the sub-pixels.

Optionally, in some embodiments of the present application, the display panel further includes a plurality of pixel areas, each of the pixel areas includes at least two adjacent columns of sub-pixels, and for a plurality of sub-pixels connected to the same first channel wire, one part of the sub-pixels are located in one of the pixel areas, and another part of the sub-pixels are located in another one of the pixel areas.

Optionally, in some embodiments of the present application, the display panel further includes a plurality of touch wires, the plurality of touch wires are arranged at intervals along the first direction; and wherein the display panel further includes a second demultiplexer, the second demultiplexer includes a plurality of second control units and a plurality of second channel wires, the plurality of second channel wires are arranged at intervals along the first direction, each of the second channel wires is connected to at least two of the touch wires, each of the second control units includes a plurality of second switching elements, one of the at least two touch wires sharing a same second channel wire is connected to one of the second channel wires through corresponding one of the second switching elements, and the second control units are arranged in the display area.

Optionally, in some embodiments of the present application, the display area includes a first display area and a second display area along the extending direction of the data lines, the first demultiplexer is disposed in the second display area, the second demultiplexer is disposed in the first display area and the second display area, in the second display area, the first switching elements are disposed in one of odd-numbered rows of sub-pixels and even-numbered rows of the sub-pixels, and the second switching elements are disposed in another one of the odd-numbered rows of the sub-pixels and the even-numbered rows of the sub-pixels.

Optionally, in some embodiments of the present application, the display panel further includes a plurality of columns of sub-pixels, and each of the columns of sub-pixels is correspondingly provided with one of the data lines; and along the first direction, the first channel wire, the touch wires, and the second channel wires are respectively adjacent to different data lines.

Optionally, in some embodiments of the present application, the display panel further includes a plurality of touch electrodes arranged in an array, each of the touch electrodes is connected to at least one touch wire, and/or each of the touch electrodes is correspondingly provided with one or more of the second channel wires.

Optionally, in some embodiments of the present application, in the first display area, each of the touch electrodes is provided with two of the second channel wires, and in the second display area, each of the touch electrodes is provided with four of the second channel wires.

Optionally, in some embodiments of the present application, the display panel further includes a plurality of touch electrodes arranged in an array, each of the touch electrodes is connected to one or more of the touch wires, and the touch electrodes are served as common electrodes: and wherein the display panel further includes a plurality of third channel wires, the plurality of third channel wires are arranged at intervals along the first direction, and each of the third channel wires is connected to a corresponding one of the touch wires.

Optionally, in some embodiments of the present application, the display panel further includes a third demultiplexer, the third demultiplexer includes a plurality of third control units, each of the third channel wires is connected to at least two of the touch wires, each of the third control units includes a plurality of third switching elements, one of the at least two touch wires sharing a same one of the third channel wires is connected to one of the third channel wires through corresponding one or more of the third switching elements, and the third control unit are disposed in the display area.

Optionally, in some embodiments of the present application, along the extending direction of the data lines, each of the touch electrodes includes a first part and a second part connected to each other, the second demultiplexer is disposed corresponding to the second part, and the third demultiplexer is disposed corresponding to the first part Correspondingly, the present application further provides a display device, including the display panel described in any of the above items and a drive chip, and the drive chip is connected to the first channel wire.

The present application provides a display panel and a display device. First, by arranging a first demultiplexer in the display panel, the embodiments of the present application can adopt less first channel wire to provide corresponding data signals to more data lines, thereby reducing quantity of driving chips and reducing production costs. Second, the embodiments of the present application can reduce a border size of the display panel by disposing the first demultiplexer in a display area, which is conducive to achieving narrow border. Third, because a plurality of sub-pixels are arranged in the display area, and first switching elements are integrated in the display area, a size of each of the first switching elements should be reduce to not to affect aperture ratio of the sub-pixels. It can be understood that a resistance of the first switching element is related to a device size. Small size and large resistance of the first switching element are likely to lead to poor data signal transmission. In the embodiments of the present application, one or more of the data lines are connected to the first channel wire through M first switching elements connected in parallel, which can improve signal transmission yield.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it should be understood that the specific embodiments described herein are only used to explain the present application and are not used to limit the present application.

In the description of the present application, it should be understood that the terms "first" and "second" are only used for descriptive purposes and cannot be understood as indicating or implying relative importance or implicitly indicating the number of indicated technical features. Thus, the features defining "first" and "second" may explicitly or implicitly include one or more of the features. Therefore, it cannot be understood as a limitation on the present application. In addition, it should be noted that unless otherwise specified and limited, the terms "connection" should be understood in a broad sense, for example, it can be mechanical connection or electrical connection; it can be directly connected or indirectly connected through an intermediate medium, and it can be the connection between two components. For those skilled in the art, the specific meaning of the above terms in the present invention can be understood in specific circumstances.

The present application provides a display panel and a display device described in detail below. It should be noted that the order of description of the following embodiments does not limit the preferred order of the embodiments of the present application.

Figure 1:
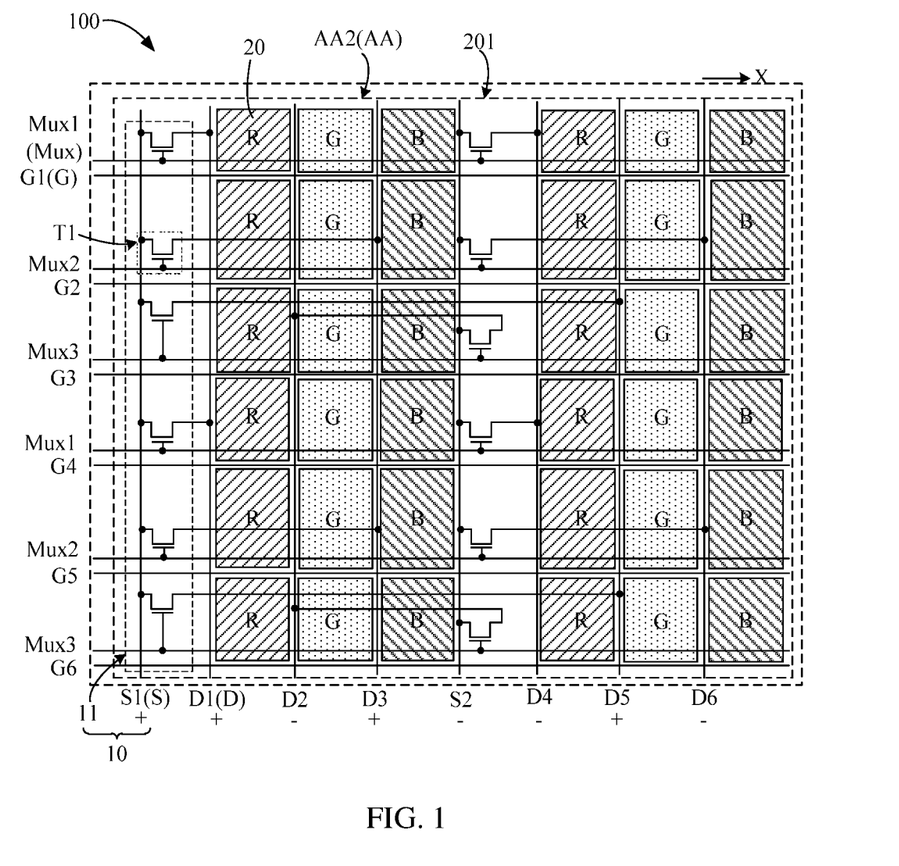
FIG. 1 is a first schematic structural diagram of a display panel provided by the present application.

Please refer to FIG. 1, FIG. 1 is a first schematic structural diagram of a display panel provided by the present application. In the embodiments of the present application, the display panel 100 includes a plurality of data lines D and a first demultiplexer 10.

Wherein the plurality of data lines D arranged at intervals along a first direction X. The first demultiplexer 10 includes one or more first control units 11 and one or more first channel wires S. An extending direction of the first channel wire S and an extending direction of the data lines D are the same. Each of the first channel wires S is connected to at least two of the data lines D. Each of the first control units 11 includes a plurality of first switching elements T1. One of the data lines D sharing the same one of the first channel wires S is connected to the first channel wire S through M of the first switching elements T1 connected in parallel, and M is an integer greater than or equal to 2. The display panel 100 includes a display area AA. The first control unit 11 is arranged in the display area AA.

In the embodiments of the present application, the display panel 100 further includes a plurality of scanning lines G (such as G1/G2/G3/G4/G5/G6, etc.). The plurality of scanning lines G are arranged at intervals along the extending direction of the data lines D. The plurality of scanning lines G and the plurality of data lines D cross define a plurality of sub-pixels 20. The plurality of sub-pixels 20 are arranged in an array. Each of the sub-pixels 20 is connected to a corresponding data line D and a corresponding scanning line G. Because one of the first channel wires S is connected to a plurality of data lines D, the sub-pixels 20 of a corresponding row can be controlled to turn on through the plurality of scanning lines G to avoid transmission errors of data signals.

The sub-pixel 20 displayed in the display image can be red sub-pixel, green sub-pixel, blue sub-pixel, white sub-pixel, yellow sub-pixel, etc., which is not specifically defined in the present application. The display panel 100 provided in the present application can adopt standard RGB pixel arrangement architecture, RGB PenTile pixel arrangement architecture, RGB Delta pixel arrangement architecture, RGBW pixel arrangement architecture, etc. When the display panel 100 adopts the standard RGB pixel arrangement architecture, in the same row of the sub-pixels 20, the red sub-pixels, the green sub-pixels, and the blue sub-pixels can be arranged repeatedly in any arrangement of RGB, RBG, BGR, BRG, GRB, GBR, and other arrangements. Each column of the sub-pixels 20 has the same color. Of course, the present application is not limited to this, and can be specifically arranged according to display requirements of the display panel 100.

In the embodiments of the present application, First, by disposing the first demultiplexer 10 in the display panel 100, less first channel wire S can be adopted to provide corresponding data signals to more data lines D, thereby reducing quantity of driving chips and reducing production costs. Second, Demux circuit is usually disposed in a border area, and its height can reach hundreds or even thousands of microns, which has become a major difficulty to achieve narrow screen border. The embodiments of the present application can reduce a border size of the display panel 100 by disposing the first demultiplexer 10 in a display area AA, which is conducive to achieving narrow border. Third, because the display area AA is provided with a plurality of sub-pixels 20, and the first switching elements T1 are integrated in the display area AA, in order not to affect aperture ratio of the sub-pixels 20, sizes of the first switching elements T1 are very small. It can be understood that a resistance of the first switching element T1 is related to a device size, and the size of the first switching element T1 is very small, which is easy to lead to poor data signal transmission. In the embodiments of the present application, one or more of the data lines D are connected to the first channel wire S through M of the first switching elements T1 connected in parallel, which can improve transmission quality of data signals.

In the embodiments of the present application, the first demultiplexer 10 further includes at least two control lines Mux. The at least two control lines Mux are arranged at intervals along the extending direction of the data lines D. Each of the at least two control lines Mux is configured to transmit corresponding control signal. A control end of each of the first switching elements T1 is connected to a corresponding one of the at least two control lines Mux. The control lines Mux are configured to control turning on or off of the first switching elements T1.

The control lines Mux can be disposed on the same layer as the scanning lines G. On one hand, it is conducive to reducing a film structure of the display panel 100 and realizing thinning of the display panel 100. On the other hand, the control lines Mux can be formed synchronously in a process of manufacturing the scanning line G, so as to save production process and improve production efficiency. Of course, the control lines Mux can also be formed on different conductive layers from the scanning line G.

Wherein an input electrode of the first switching element T1 is connected to a corresponding one of the first channel wire S. An output electrode of the first switching element T1 is connected to a corresponding one of the data lines D. The first switching element T1 can be a thin-film transistor. The control end of the first switching element T1 is a gate of the thin-film transistor. The input electrode of the first switching element T1 is one of a source and a drain of the thin-film transistor. The output electrode of the first switching element T1 is another one of the source and the drain of the thin-film transistor. The control lines Mux control the turning on or off of the first switching elements T1 connected to it, so that the first channel wire S can transmit data signals to the corresponding data lines D.

Correspondingly, when the first switching element T1 is a thin-film transistor, a greater channel width to length ratio W/L of a thin-film transistor results in a smaller resistance under the same condition. However, when a size of the first switching element T1 is small, the channel width to length ratio W/L of the first switching element T1 is difficult to meet predisposed requirements, then resulting in poor data signal transmission. Therefore, the embodiments of the present application arrange one or more data lines D connected to the first channel wire S through M of the first switching elements T1 connected in parallel, and resistances of multiple first switching elements T1 connected in parallel decrease, which can improve the transmission quality of data signals.

In the embodiments of the present application, a quantity of the control lines Mux is related to a quantity of the data lines D connected to each first channel wire S1. Each first channel wire S1 can be connected to two of the data lines D. Each first channel wire S1 can also be connected to three of the data lines D. Each first channel wire S1 can also be connected to four of the data lines D: which will not be described in detail here.

It should be noted that the following embodiments of the present application are described according to an embodiment including a connection of each first channel wire S1 and three of the data lines D. Accordingly, the control lines Mux includes first control lines Mux1, second control lines Mux2, and third control lines Mux3. However, it should not be construed as a limitation of the present application.

In some embodiments of the present application, M control lines Mux transmit the same control signal. M of the first switching elements T1 connected to the same one of the data lines D are connected to the M of the control lines transmitting the same control signal in one-to-one correspondence. That is, quantity of one or more of the first control lines Mux1, the second control lines Mux2, and the third control lines Mux3 can be M.

In detail, please refer to FIG. 1. In the embodiments of the present application, a quantity of the first control lines Mux1, the second control lines Mux2, or the third control lines Mux3 are two. Two of the first control lines Mux1 can be connected in parallel to access the same control signal. The two of the first control lines Mux1 can also access the same control signal respectively. Two of the second control lines Mux2 can be connected in parallel to access the same control signal. The two of the second control lines Mux2 can also access to the same control signal respectively. Two of the third control lines Mux3 can be connected in parallel to access a same control signal. The two of the third control lines Mux3 can also access the same control signal respectively.

Two of the first switching elements T1 connected to a first one of the data lines D1 or a fourth one of the data lines D4 are connected to the two of the first control lines Mux1 respectively. Two of the first switching elements T1 connected to a second one of the data lines D2 or a fifth one of the data lines D5 are connected to the two of the second control lines Mux2 respectively. Two of the first switching elements T1 connected to a third one of the data lines D3 or a sixth one of the data lines D6 are connected to the two of the third control lines Mux3 in one-to-one correspondence.

Along the extending direction of the data lines D, a plurality of control lines Mux can be repeatedly arranged in a unit of the first control line Mux1, the second control line Mux2, and the third control line Mux3.

Therefore, the embodiments of the present application can realize a parallel connection of the plurality of first switching elements T1 connected to the same one of the data lines D to improve conductivity of the plurality of first switching elements T1, and avoid from poor data signal transmission.

It should be noted that in some embodiments of the present application, quantity of the first switching elements T1 connected to the same one of the data lines D can also be three, four or more. Correspondingly, three, four or more first control lines Mux1 (the second control line Mux2 or the third control line Mux3) can be provided, which will not be repeated here.

Of course, in some embodiments of the present application, the first demultiplexer 10 can further include at least two control lines Mux, and the at least two control lines Mux transmit different control signals. The control ends of the plurality of first switching elements T1 connected to the same one of the data lines D are connected to the same one of the at least two control lines Mux.

The embodiments of the present application can reduce quantity of the control lines Mux. Some of the first switching elements T1 can be connected to a corresponding one of the control lines Mux by wires in different layers, which will not be described in detail here.

Further, in some embodiments of the present application, the plurality of first switching elements T1 are disposed in different sub-pixels 20. At most one control line Mux is disposed in each row of the sub-pixels 20.

It can be understood that the display panel 100 has certain requirement for specifications of pixel aperture ratio. In the embodiments of the present application, the plurality of first switching elements T1 are disposed in different sub-pixels 20 respectively, and only one control line Mux is disposed in the corresponding row of the sub-pixels 20, which can reduce an impact on the pixel aperture ratio and improve display uniformity of the display panel 100.

In the embodiments of the present application, data voltage polarities of the data lines D connected to the same first channel wire S is the same. Of course, in some embodiments, by adjusting and transforming the polarities of the data voltages in the driving chip, the data voltage polarities of the data lines D connected to the same first channel wire line S can also be different.

In the embodiments of the present application, by adjusting connection manner between the data lines D and the first channel wire S, or adjusting connection manner between the sub-pixels 20 and the data lines D, different driving modes can be realized, such as point inversion, column inversion, frame inversion, row inversion, etc.

Please refer to FIG. 1. In the embodiments of the present application, the display panel 100 further includes one or more pixel areas 201. In the first direction X, the pixel area 201 includes 2N columns sub-pixels 20. Each pixel area 201 is provided with two of the first channel wires S. Each column of the 2N columns sub-pixels 20 is correspondingly provided with one of the data lines D. Wherein N is an integer greater than or equal to 2.

The data voltage polarities of adjacent two of the first channel wires S are opposite. In each pixel area 201 along the first direction X, a first one of the two of the first channel wires S1 is respectively connected to odd-numbered data lines D. The second one of the two of the first channel wires S2 is respectively connected to even-numbered data lines D.

With the above connection manner, polarities in each column of the sub-pixels 20 are the same, and polarities of adjacent two of the sub-pixels 20 in each row of the sub-pixel 20 are opposite. That is, the embodiments of the present application can realize a driving mode of column inversion and improve display problems such as image crosstalk.

Further, the value of N in the embodiment of the present application is 3 and the pixel area 201 includes six columns of sub-pixel 20 as an example to explain. That is, each first channel wire S transmits corresponding data signals to three data lines D respectively.

In detail, in each pixel area 201 along the first direction X, the first one of the two of the first channel wires S1 is disposed adjacent to the first one of the data lines D1. For example, the first one of the two of the first channel wires S1 is disposed on a left side of the first one of the data lines D1. The second one of the two of the first channel wires S2 is disposed adjacent to the fourth one of the data lines D4. For example, the second one of the two of the first channel wires S2 is disposed on a left side of the fourth one of the data lines D4. The first one of the two of the first channel wires S1 is respectively connected to the first one of the data lines D1, the fifth one of the data lines D5, and the third one of the data lines D3. The second one of the two of the first channel wires S2 is respectively connected to the fourth one of the data lines D4, the second one of the data lines D2, and the sixth one of the data lines D6.

The first one of the two of the first channel wires S1 transmits data signals with positive polarity. The second one of the two of the first channel wires S2 transmits data signals with negative polarity. Therefore, along the first direction X, the first column sub-pixels 20, the third column sub-pixels 20, and the fifth column sub-pixels 20 are all positive: the second column sub-pixels 20, the fourth column sub-pixels 20, and the sixth column sub-pixels 20 are all negative.

In the embodiments of the present application, each pixel area 201 can include at least two adjacent columns of sub-pixels 20. For example, each pixel area 201 can include RGB three columns sub-pixels 20. Among the plurality of sub-pixels 20 connected to the same first channel wire S, part of the sub-pixels 20 are located in one pixel area 201, and another part of the sub-pixels 20 are located in another pixel area 201. The data voltage polarity required by each of the sub-pixels 20 located in different pixel areas 201 can be achieved by a designing of wires in different layers in display.

Figure 2:
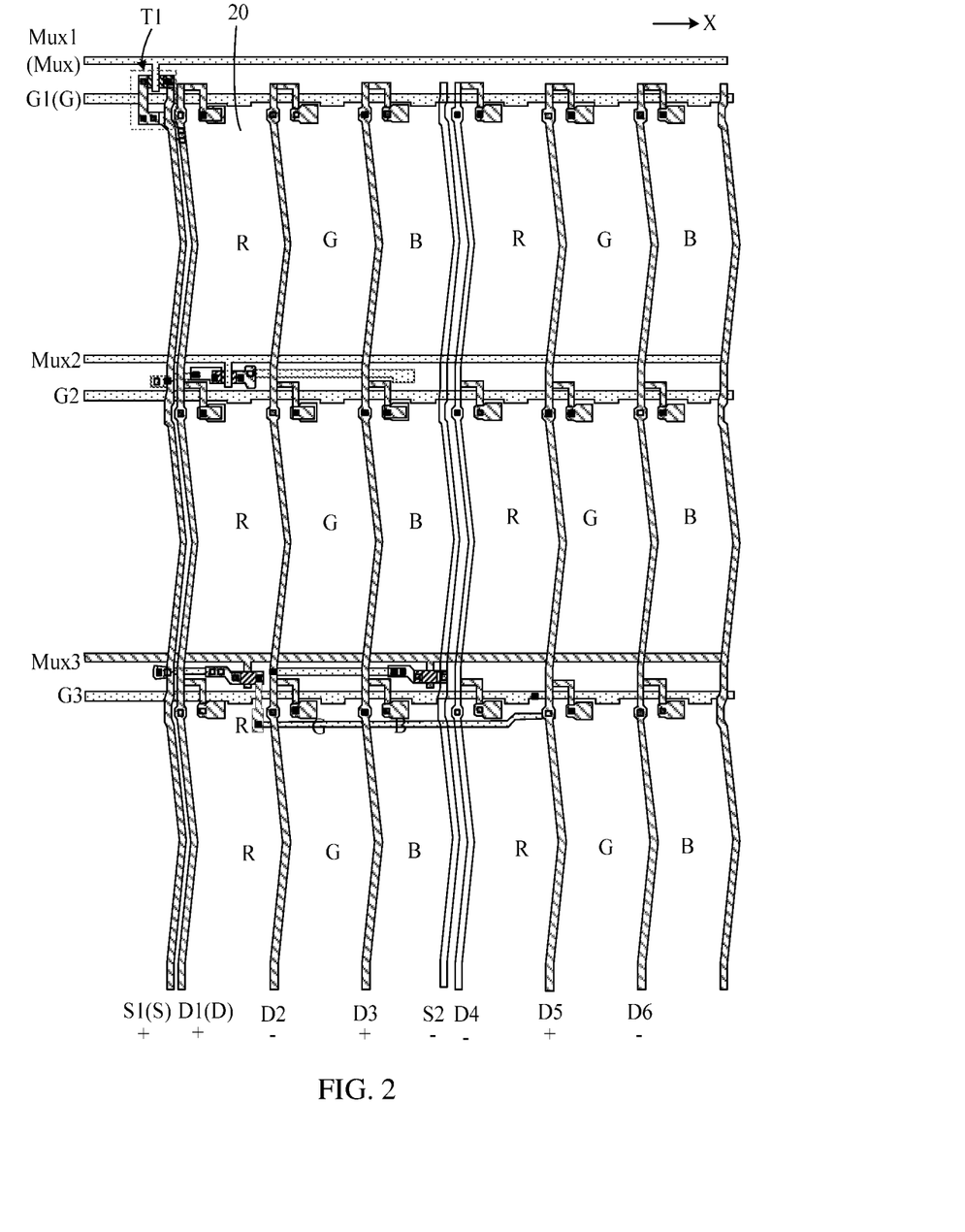
FIG. 2 is a first schematic planar diagram of the display panel provided in the present application.

Further, please refer to FIG. 1 and FIG. 2, FIG. 2 is a first schematic planar diagram of the display panel provided in the present application. As shown in FIG. 2, because the first one of the two of the first channel wires S1 is disposed on the left side of the first one of the data lines D1, in order to avoid short circuit between different signal lines, it is necessary to change layers of the wire several times to realize a connection between the first one of the two of the first channel wires S1 and the fifth one of the data lines D5. In the same way, because the second one of the two of the first channel wires S2 is disposed on the left side of the fourth one of the data lines D4, a connection between the second one of the two of the first channel wires S2 and the second one of the data lines D2 can be realized by changing layers of the wire several times. The design of change layers of the wire several times leads to a certain loss of pixel opening rate.

Figure 3:
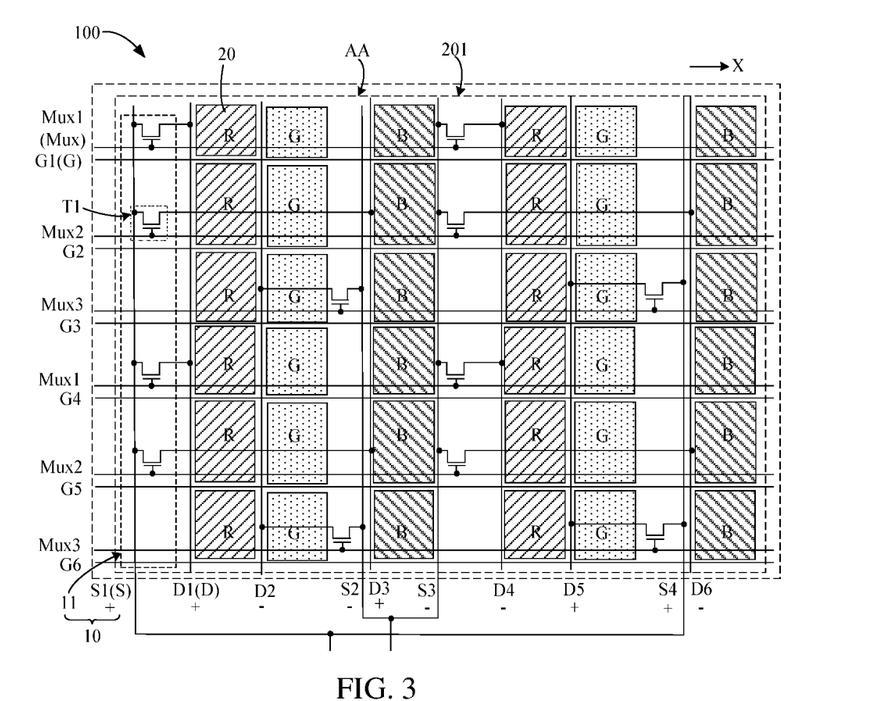
FIG. 3 is a second schematic structural diagram of the display panel provided by the present application.
Figure 4:
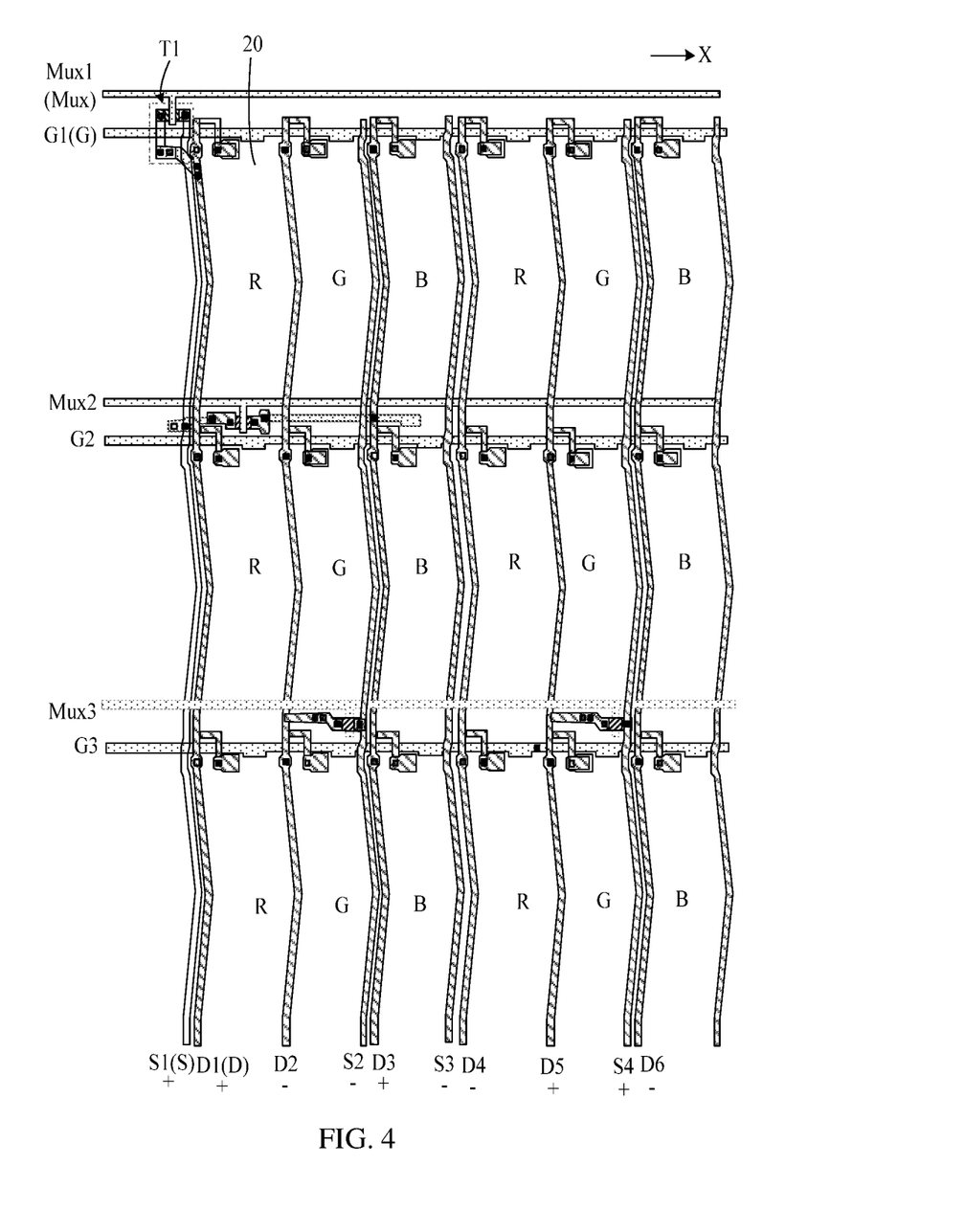
FIG. 4 is a second schematic planar diagram of the display panel provided in the present application.

For this issue, please refer to FIG. 3 and FIG. 4. FIG. 3 is a second schematic structural diagram of the display panel provided by the present application. FIG. 4 is a second schematic planar diagram of the display panel provided in the present application. A difference between the display panel 100 shown in FIG. 1 and FIG. 2 from this embodiment is that in the embodiment of the present application, one or more auxiliary channel wires are disposed between two adjacent first channel wires S, and the first switching elements T1 connected to the auxiliary channel wire are disposed in the sub-pixels 20 adjacent to the auxiliary channel wire.

In the first direction X among adjacent two of the first channel wires S and one auxiliary channel wire, a data voltage polarity of a previous one of the adjacent two of the first channel wires S is opposite to a data voltage polarity of the auxiliary channel wire. A data voltage polarity of a last one of the adjacent two of the first channel wires S is the same as the data voltage polarity of the auxiliary channel wire.

In the embodiments of the present application, the auxiliary channel wire is added between the adjacent two of the first channel wires S, and column inversion can be achieved by controlling the voltage polarity of the auxiliary channel wire. At the same time, the first switching elements T1 connected to the auxiliary channel wire are disposed in the sub-pixels 20 adjacent to the auxiliary channel wire. Without changing layers of the wires, the auxiliary channel wire can be connected to the corresponding sub-pixels 20 and the data lines D.

Further, in an embodiment, each pixel area 201 includes six columns of sub-pixels 20. Each pixel area 201 is provided with four of the first channel wires S. Each column of the six columns of sub-pixels 20 is correspondingly provided with one of the data lines D.

In each pixel area 201, a first one of the four of the first channel wires S1 is connected to the first one of the data lines D1 and the third one of the data lines D3 along the first direction X. A second one of the four of the first channel wires S2 is connected to the second one of the data lines D2. A third one of the four of the first channel wires S3 is respectively connected to the fourth one of the data lines D4 and the sixth one of the data lines D6. A fourth one of the four of the first channel wires S4 is connected to the fifth one of the data lines D5.

Wherein the second one of the four of the first channel wires S2 and the fourth one of the four of the first channel wires S4 are both auxiliary channel wire. A data voltage polarity of the first one of the four of the first channel wires S1 is the same as a data voltage polarity of the fourth one of the four of the first channel wires S4. A data voltage polarity of the second one of the four of the first channel wires S2 is the same as a data voltage polarity of the third one of the four of the first channel wires S3. The data voltage polarity of the first one of the four of the first channel wires S1 is opposite to the data voltage polarity of the second one of the four of the first channel wires S2.

Thus, while realizing the driving mode of column inversion, changing layers of the wires in the display area AA can be reduced, thereby increasing the pixel aperture ratio and improving image display effect.

Further, in the embodiments of the present application, the first one of the four of the first channel wires S1 is connected in parallel with the fourth one of the four of the first channel wires S4. The second one of the four of the first channel wires S2 is connected in parallel with the third one of the four of the first channel wires S3.

It can be understood that because the data voltage polarities of the first one of the four of the first channel wires S1 and the fourth one of the four of the first channel wires S4 is same, and three data lines D connected to the first one of the four of the first channel wires S1 and the fourth one of the four of the first channel wires S4 respectively realize the transmission of data signals through different first switching elements T1, the first one of the four of the first channel wires S1 and the fourth one of the four of the first channel wires S4 can be designed to connect in parallel, and further reduce the quantity of the first channel line S, thereby reducing the quantity of driving chips. Similarly, parallel design of the second one of the four of the first channel wires S2 and the third one of the four of the first channel wires S3 can also reduce the quantity of driving chips and production costs.

Figure 5:
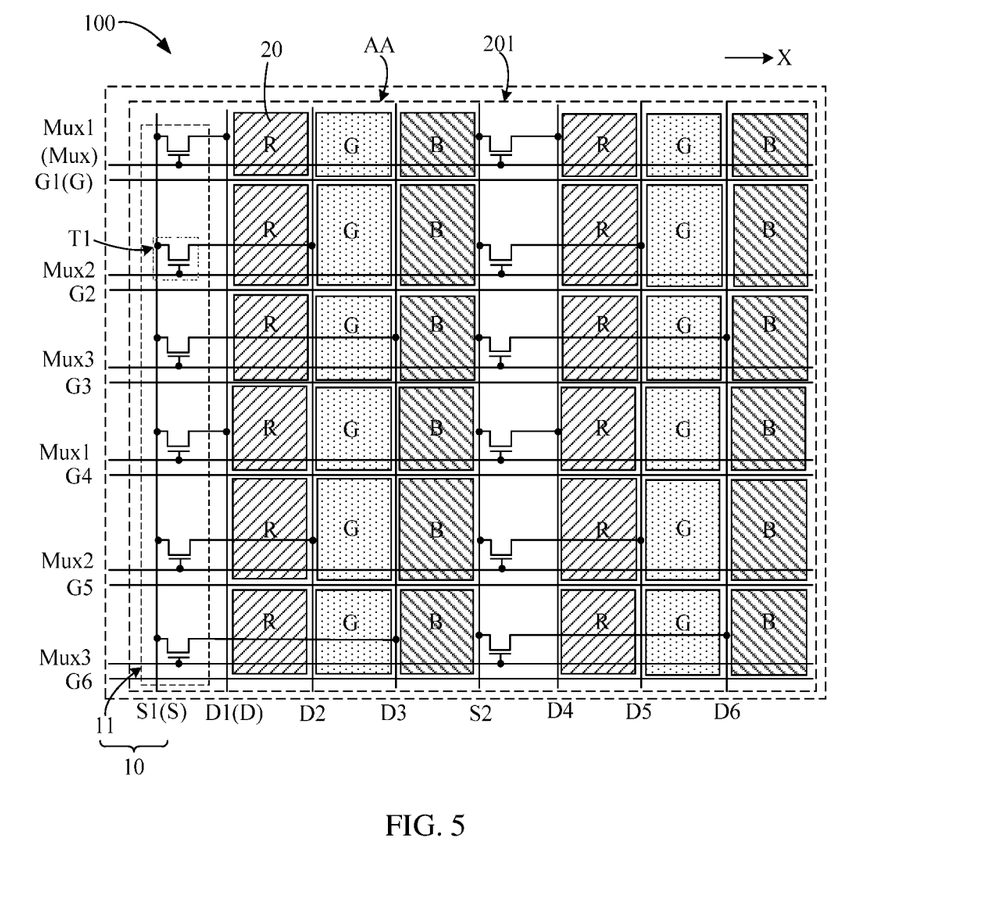
FIG. 5 is a third schematic structural diagram of the display panel provided by the present application.

In some embodiments of the present application, please refer to FIG. 5, FIG. 5 is a third schematic structural diagram of the display panel provided by the present application. A difference between the display panel 100 shown in FIG. 1 and FIG. 2 from this embodiment here is that, in the embodiments of the present application, the pixel area 201 includes N columns of sub-pixels 20 along the first direction X. Each pixel area 201 is provided with a first channel wire S. N is an integer greater than or equal to 2. In each pixel area 201, the first channel wire S is respectively connected to the data lines D corresponding to each column of sub-pixel 20.

As shown in FIG. 5, the value of N in the embodiment of the present application is 3 as an example to be described, but it cannot be understood as a limitation of the present application. In detail, along the first direction X, the first one of two of the first channel wires S1 is respectively connected to the first one of the data lines D1, the second one of the data lines D2, and the third one of the data lines D3. The second one of the two of the first channel wires S2 is respectively connected to the fourth one of the data lines D4, the fifth one of the data lines D5, and the sixth one of the data lines D6.

In the embodiments of the present application, the plurality of first channel wires S can transmit data signals with a same polarity. At a same time, there are less designs of changing layers of wires in the display area AA, which further improves the pixel aperture ratio.

Figure 6:
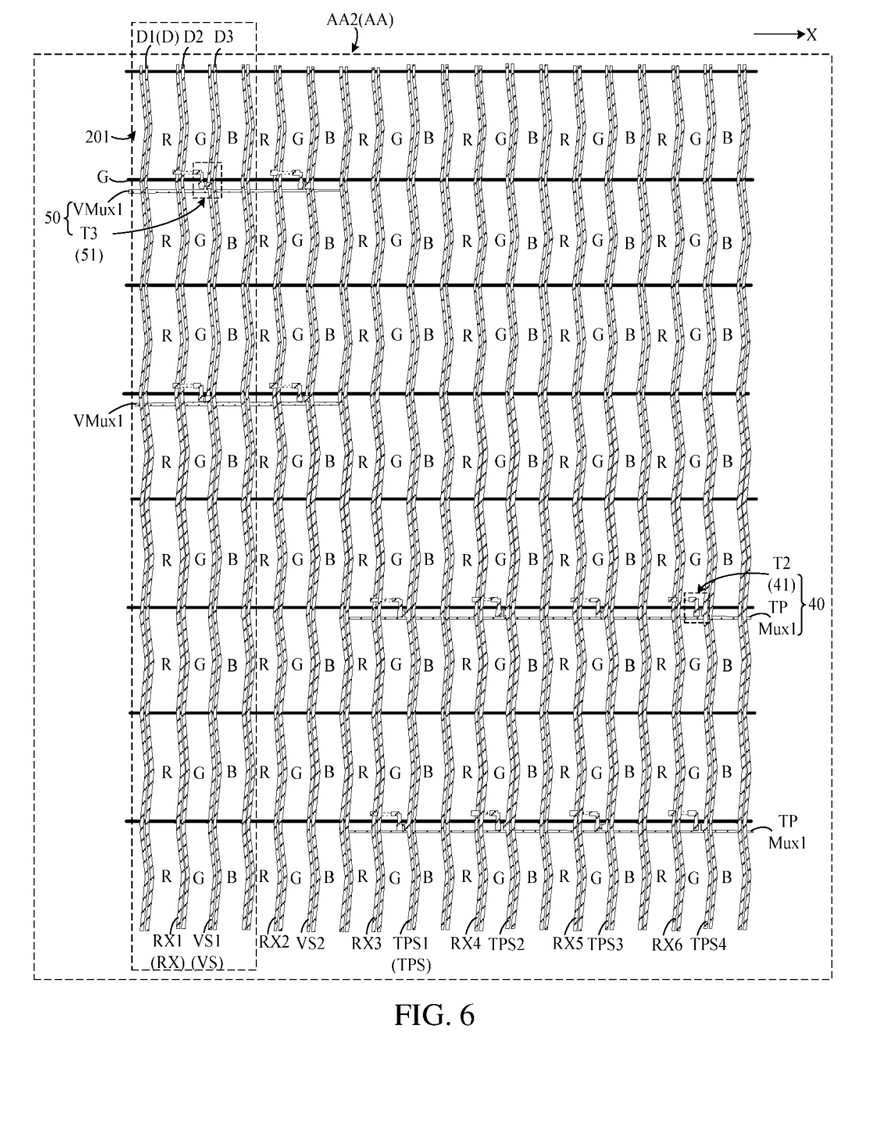
FIG. 6 is a third schematic planar diagram of the display panel provided in the present application.
Figure 7:
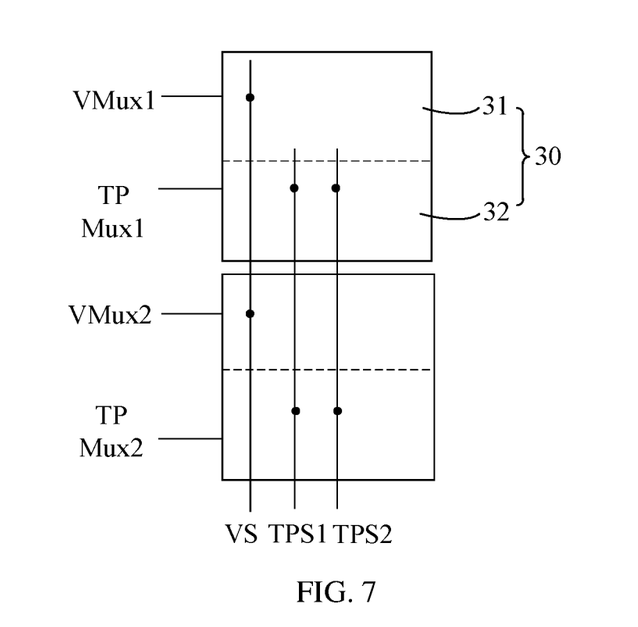
FIG. 7 is a schematic structural diagram of touch electrodes, a second demultiplexer, and a third demultiplexer provided in the present application.

In some embodiments of the present application, please refer to FIG. 6 and FIG. 7. FIG. 6 is a third schematic planar diagram of the display panel provided in the present application. FIG. 7 is a schematic structural diagram of touch electrodes, a second demultiplexer, and a third demultiplexer provided in the present application. A difference between the display panel 100 shown in FIG. 1 and FIG. 2 from this embodiment is that in the embodiment of the present application, the display panel 100 further includes a plurality of touch wires RX. The plurality of touch wires RX are arranged at intervals along the first direction X.

The display panel 100 further includes a second demultiplexer 40. The second demultiplexer 40 includes a plurality of second control units 41 and a plurality of second channel wires TPS. The plurality of second channel wires TPS are arranged at intervals along the first direction X. Each of the second channel wires TPS is connected to at least two of the touch wires RX. Each of the second control units 41 includes a plurality of second switching elements T2. Among a plurality of touch wires RX sharing the same one of the second channel wires TPS, one or more touch wires RX are connected to one of the second channel wires TPS through one or more second switching elements T2.

By disposing the second demultiplexer 40 in the display area AA, the present application can further reduce the border size of the display panel 100, which is conducive to achieving narrow border.

It should be noted that in order to improve the display uniformity of the display panel 100, the first channel wires S and the second channel wires TPS can be disposed in different columns of the sub-pixels 20.

In the embodiments of the present application, the display panel 100 further includes a plurality of touch electrodes 30. Each of the touch electrodes 30 can be designed corresponding to a plurality of sub-pixels 20. For example, each of the touch electrodes 30 can be disposed corresponding to 40 rows and 40 columns of the sub-pixels 20, which is not specifically defined in the present application. FIG. 6 only shows part of the structure of the touch electrode 30, but it cannot be construed as the limitation of the present application.

Each of the touch electrodes 30 is connected to one or more touch wires RX. It can be understood that considering a larger area of the touch electrode 30 and in order to improve uniformity of a distribution of touch signal, the plurality of touch wires RX can be disposed to connect to a same one of the touch electrodes 30 to transmit the touch signal to different positions of the touch electrode 30.

Each of the touch electrodes 30 is provided with one or more second channel wires TPS. Similarly, because the area of the touch electrode 30 is large, a plurality of second channel wires TPS can be disposed to provide touch signals to the plurality of touch wires RX. In an embodiment that each row of the touch electrodes 30 corresponds to a plurality of second channel wires TPS, the plurality of second channel wires TPS can be connected in parallel to further reduce a quantity of channels of the driving chip.

As shown in FIG. 6, each touch electrodes 30 of the embodiment of the present application is connected to three touch wires RX as an example to explain. Wherein along the first direction X, a second one of the three touch wires RX2 is connected to a first one of the second channel wires TPS1 through the second switching elements T2. A second one of the three touch wires RX2 is connected to a second one of the channel wires TPS2 through the second switching element T2.

The second demultiplexer 40 further includes a plurality of control signal lines TPMux. The plurality of control signal lines TPMux are disposed at intervals along the extending direction of the data lines D. Similarly, the embodiments of the present application can provide that one or more touch wires RX are connected to the second channel wire TPS through a plurality of second switching elements T2 connected in parallel to improve transmission quality of touch signals. For example, as shown in FIG. 6, there are two of the first control signal lines TPMux1. Each touch wire RX is connected to the same second channel wire TPS through two of the second switching elements T2. The two of the second switching elements T2 are respectively connected to the two of the first control signal lines TPMux1, so as to realize a parallel connection of the two of the second switching elements T2.

As shown in FIG. 7, the second demultiplexer 40 includes two control signal lines TPMux connected to different control signals. Along the extending direction of data lines D and among two adjacent touch electrodes 30, the first control signal line TPMux1 is configured to control the first one of the second channel wires TPS1 and the second one of the second channel wires TPS2 to transmit the touch signal to an upper touch electrode 30. The second control signal line TPMux2 is configured to control the first one of the second channel wires TPS1 and the second one of the second channel wires TPS2 to transmit the touch signal to a lower touch electrode 30. That is, the same one of the second channel wires TPS is connected to at least two of the touch wires RX, so as to control the upper touch electrodes 30 and the lower touch electrode 30, so that the touch electrodes 30 of odd-numbered rows and even-numbered rows work at different time.

In order to improve the display uniformity of the display panel 100, the first channel wire S, the touch wires RX, and the second channel wires TPS can be disposed adjacent to different data lines D respectively.

In the embodiments of the present application, the display panel 100 further includes a plurality of third channel wires VS. The plurality of third channel wires VS are arranged at intervals along the first direction X. Each of the third channel wires VS is connected to a corresponding one of the touch electrodes 30. FIG. 6 only shows one third channel wire VS, but it cannot be construed as a limitation of the present application.

It should be noted that in order to improve the display uniformity of the display panel 100, the first channel wire S, the second channel wires TPS, and the third channel wires VS can be disposed adjacent to different data lines D respectively.

In some embodiments of the present application, the touch electrodes 30 can be served as common electrodes. In a display phase, each of the third channel wires VS transmits a common voltage to the corresponding touch electrodes 30. In a touch phase, each of the third channel wires VS transmits a touch signal to the corresponding touch electrode 30. Considering the larger area of the touch electrode 30, the third channel wires VS are configured to transmit the touch signal to the corresponding touch electrodes 30 to enhance magnitude of the touch signal and to improve the uniformity of the distribution of the touch signal.

In some embodiments of the present application, the display panel 100 further includes a third demultiplexer 50. The third demultiplexer 50 includes a plurality of third control units 51. Each of the third channel wires VS is connected to at least two of the touch wires RX. Each of the third control units 51 includes a plurality of third switching elements T3. At least one of the plurality of touch wires RX sharing the same third channel wires VS is connected to one of the third channel wires VS through one or more corresponding third switching elements T3.

By disposing the third demultiplexer 50 in the display area AA, the present application can further reduce the border size of the display panel 100, which is conducive to achieving narrow border. Similarly, the embodiments of the present application can provide that at least one touch wire RX is connected to the third channel wire VS through a number of third switching elements T3 connected in parallel, which can improve the transmission quality of the touch signal.

It should be noted that a structure and a connection manner of the second switching elements T2 and the third switching elements T3 can refer to the first switching elements T1 in the above embodiments and will not be described in detail here.

The third demultiplexer 50 further includes a plurality of control wires VMux. The plurality of control wires VMux are disposed at intervals along the extending direction of the data lines D. FIG. 6 shows only one control wire VMux, but it cannot be construed as the limitation of the present application.

Similarly, the embodiments of the present application can provide that at least one touch line RX is connected to the third channel line VS through a number of third switching elements T3 connected in parallel to improve the transmission quality of touch signal. For example, as shown in FIG. 6, there are two of the first control wire VMux. Each of the touch wires RX is connected to the same third channel wire VS through two of the third switching elements T3. The two of the third switching elements T3 are respectively connected to the two of the first control wires VMux correspondingly, so as to realize the parallel connection of the two of the third switching elements T3.

In detail, as shown in FIG. 6 and FIG. 7, the third demultiplexer 50 includes two control wires VMux configured to receive different control signals. Along the extending direction of the data lines D and among adjacent two touch electrodes 30, a first one of the two control wires VMux1 is configured to control the third channel wire VS to transmit the touch signal to a upper touch electrode 30. The second one of the two control wires VMux2 is configured to control the third channel wire VS to transmit the touch signal to a lower touch electrode 30.

Further, in some embodiments of the present application, as shown in FIG. 7, along the extending direction of the data lines D, each touch electrode 30 includes a first part 31 and a second part 32 connected to each other. The second demultiplexer 40 is disposed corresponding to the second part 32, and the third demultiplexer 50 is disposed corresponding to the first part 31.

It can be understood that the embodiments of the present application dispose the second multiplexer 40 and the third multiplexer 50 in different regions to ensure the display uniformity of the display panel 100.

Figure 8:
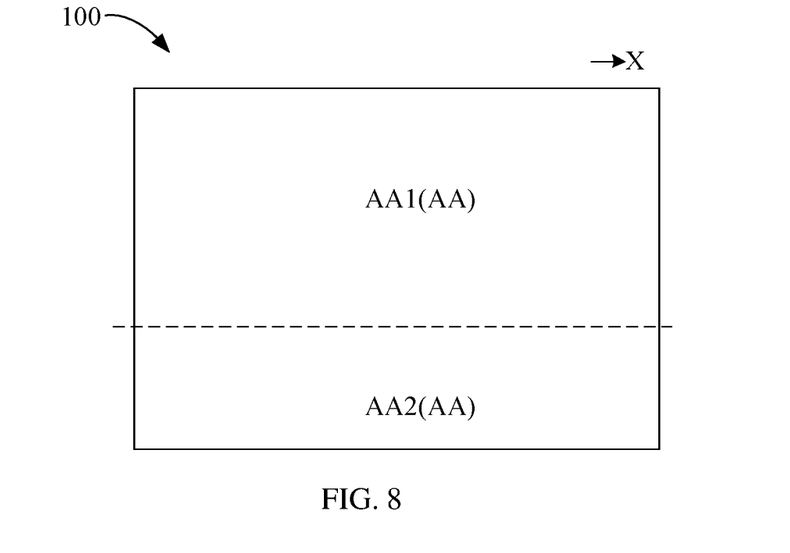
FIG. 8 is a fourth schematic planar diagram of the display panel provided in the present application.

In some embodiments of the present application, please refer to FIG. 1, FIG. 6, and FIG. 8 at a same time. Along the extending direction of the data lines D, the display area AA includes a first display area AA1 and a second display area AA2. The first demultiplexer 10 is arranged in the second display area AA2. The second demultiplexer 40 is arranged in the first display area AA1 and the second display area AA2. In the second display area AA2, the first switching elements T1 are disposed in odd-numbered rows or even-numbered rows of the sub-pixels. The second switching element T2 is disposed in the odd-numbered rows or the even-numbered rows of the sub-pixels other than the first switching elements T1.

Further, the third demultiplexer 50 can be arranged in the first display area AA1 and the second display area AA2. The first switching elements T1 and the third switching elements T3 are also disposed in different rows of the sub-pixels 20.

For example, take a display panel 100 with 1920×720 resolution as an example. In lower 240 rows of the display panel 100 (occupying a height of 6 of the touch electrodes 30), the first demultiplexer 10, the second demultiplexer 40, and the third demultiplexer 50 are distributed in different areas of the display panel 100. In upper 480 rows of the display panel 100 (occupying a height of 12 of the touch electrodes 30), only the second demultiplexer 40 and the third demultiplexer 50 are provided. Of course, the present application is not limited to this.

Therefore, the first demultiplexer 10, the second demultiplexer 40, and the third demultiplexer 50 can be uniformly arranged in the display area AA to improve the display uniformity of the display panel 100.

Figure 9:
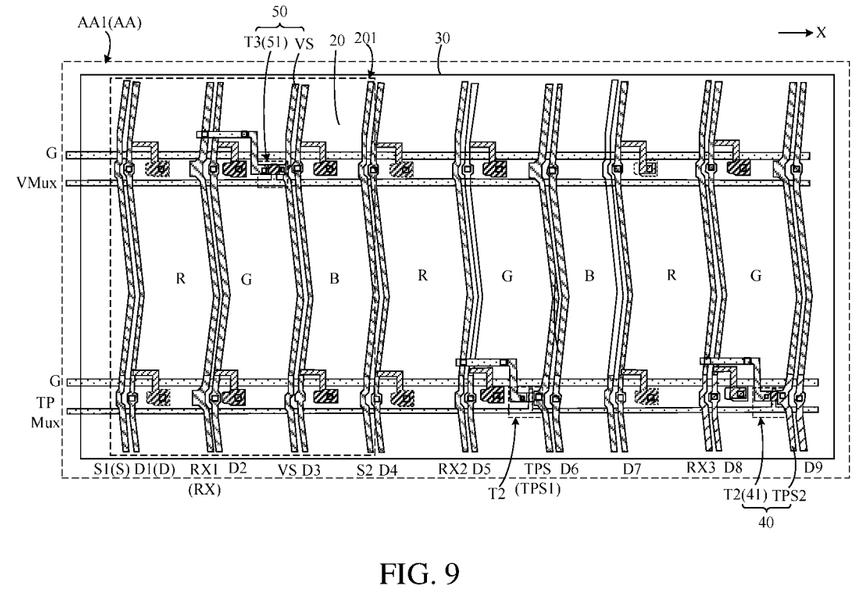
FIG. 9 is a fifth schematic planar diagram of the display panel provided in the present application.

In addition, in some embodiments of the present application, in the first display area AA1, as shown in FIG. 9, each of the touch electrodes 30 is provided with two of the second channel wires TPS. In the second display area AA2, as shown in FIG. 6, each of the touch electrodes 30 is provided with four of the second channel wires TPS.

Furthermore, in the first display area AA1, each of the touch electrodes 30 is provided with one of the third channel wires VS, and in the second display area AA2, each of the touch electrode 30 is provided with two of the third channel wires VS.

It can be understood that the second display area AA2 is provided with the first demultiplexer 10, the second demultiplexer 40, and the third demultiplexer 50. The first demultiplexer 10 occupies a part of wire space. Thus, in the second display area AA2, the second switching elements T2 and the third switching elements T3 can only be disposed in either the odd-numbered rows or the even-numbered rows of sub-pixels to be staggered with the first switching elements T1. Therefore, in order to improve the transmission quality of touch signals, in the second display area AA2 of the embodiments of the present application, each touch electrodes 30 is provided with four of the second channel wires TPS and two of the third channel wires VS.

Accordingly, the present application also provides a display device. The display device includes the display panel 100 described in any of the above embodiments, which will not be described in detail here.

In addition, the display device can be a smart phone, a tablet computer, an e-book reader, a smart watch, a video camera, a game console, etc., which is not limited in the present application.

Figure 10:
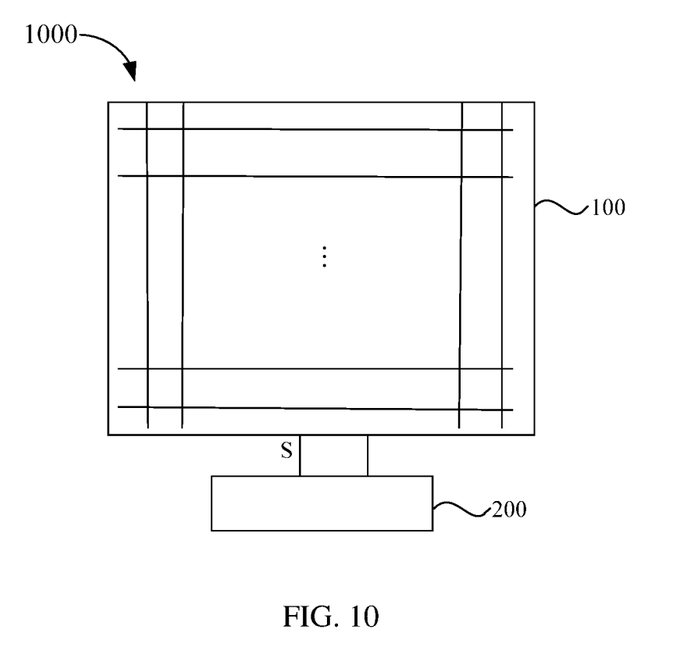
FIG. 10 is a schematic structural diagram of a display device provided by the present application.

For details, please refer to FIG. 10, FIG. 10 is a schematic structural diagram of a display device provided by the present application. In the embodiments of the present application, the display device 1000 includes a display panel 100 and a drive chip 200. The drive chip 200 is connected to the plurality of first channel wires S.

The driving chip 200 can be a source drive chip. The driving chip 200 is configured to provide data signals to the plurality of first channel wires S, thereby driving each sub-pixel for image display.

In the embodiments of the present application, the second channel wires TPS and the third channel wires VS can also be connected to the driving chip 200. The driving chip 200 is also configured to provide touch signals and common voltages, which improves an integration of the driving chip 200 and reduces a number of the driving chip 200.

The display device 1000 in the embodiments of the present application includes a display panel 100. The display panel 100 includes a plurality of data lines and a first demultiplexer. The plurality of data lines are arranged at intervals along a first direction. The first demultiplexer includes one or more first control units and one or more first channel wires. An extending direction of the first channel wire and an extending direction of the data lines are the same. Each of the one or more first channel wires is connected to at least two of the data lines. Each of the one or more first control units includes a plurality of first switching elements. One or more of the at least two of the data lines sharing the same first channel wire are connected to the first channel wire through M of the first switching elements connected in parallel, and M≥2. The display panel includes a display area, and the first control unit is disposed in the display area. The embodiments of the present application integrate the first demultiplexer into the display area, which can reduce a border size of the display panel 100 and achieve the narrow border of the display device 1000.

A display panel and a display device are described in detail above. And in this paper, specific examples are applied to explain the principle and implementation of the present application. The above embodiments are only examples of the implementation of the present invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention. The content of this specification should not be construed as a limitation on the application

What is claimed is:

1. A display panel, comprising:
a plurality of data lines, wherein the plurality of data lines are arranged at intervals along a first direction; and
a first demultiplexer, wherein the first demultiplexer comprises a first control unit and a first channel wire, an extending direction of the first channel wire and an extending direction of the data lines are same, the first channel wire is connected to at least two of the data lines, the first control unit comprises a plurality of first switching elements, one of the at least two data lines sharing the same first channel wire is connected to the first channel wire through M first switching elements connected in parallel, and M≥2;
wherein the display panel further comprises a display area, and the first control unit is disposed in the display area; and
wherein data voltage polarities of the data lines connected to the same first channel wire are same; the display panel further comprises one pixel area, along the first direction, the pixel area comprises 2N columns of sub-pixels, the pixel area is provided with two of the first channel wires, each column of the 2N columns of sub-pixels is correspondingly provided with one of the data lines, and N is an integer greater than or equal to 2; and the data voltage polarities of two adjacent first channel wires are opposite, in the pixel area, a first one of the two adjacent first channel wires are respectively connected to odd-numbered data lines along the first direction, and a second one of the two adjacent first channel wires is respectively connected to even-numbered data lines.

2. The display panel according to claim 1, wherein the first demultiplexer further comprises at least two control lines, the at least two control lines are arranged at intervals along the extending direction of the data lines, the at least two control lines are configured to transmit different control signals, and the M first switching elements connected to the same data line are all connected to a same one of the at least two control lines.

3. The display panel according to claim 1, wherein the first demultiplexer further comprises a plurality of control lines, and the plurality of control lines are arranged at intervals along the extending direction of the data lines; and
wherein M control lines are configured to transmit a same control signal, and the M first switching elements connected to the same data line are connected to the M control lines configured to transmit the same control signal in one-to-one correspondence.

4. The display panel according to claim 3, wherein the display panel further comprises a plurality of sub-pixels arranged in an array, the plurality of first switching elements are disposed in different sub-pixels, and each row of the sub-pixels is provided with at most one of the control lines.

5. The display panel according to claim 1, wherein the display panel further comprises a plurality of columns of sub-pixels, data voltage polarities of two adjacent columns of the sub-pixels are opposite, and data voltage polarities of two adjacent first channel wires are opposite; and wherein one auxiliary channel wire is disposed between the two adjacent first channel wires, and the first switching elements connected to the auxiliary channel wire is disposed in the sub-pixels adjacent to the auxiliary channel wire.

6. The display panel according to claim 5, wherein the display panel further comprises one pixel area, the pixel area comprises six columns of sub-pixels, the pixel area is provided with four of the first channel wires, and each column of the sub-pixels is correspondingly provided with one of the data lines; and wherein in the pixel area along the first direction, a first one of the four of the first channel wires is connected to a first one of the data lines and a third one of the data lines respectively, a second one of the four of the first channel wires is connected to a second one of the data lines, a third one of the four of the first channel wires is connected to a fourth one of the data lines and a sixth one of the data lines respectively, a fourth one of the four of the first channel wires is connected to a fifth one of the data lines, and the second one of the four of the first channel wires and the fourth one of the four of the first channel wires are both auxiliary channel wires.

7. The display panel according to claim 6, wherein the first one of the four of the channel wires is connected in parallel with the fourth one of the four of the channel wires, and the second one of the four of the channel wires is connected in parallel with the third one of the four of the channel wires.

8. The display panel according to claim 1, wherein the display panel further comprises one pixel area, along the first direction, the pixel area comprises N columns of sub-pixels, the pixel area is provided with one of the first channel wires, and N is an integer greater than or equal to 2; and wherein in the pixel area, the first channel wire is respectively connected to the data lines corresponding to each column of the sub-pixels.

9. The display panel according to claim 1, wherein the display panel further comprises a plurality of pixel areas, each of the pixel areas comprises at least two adjacent columns of sub-pixels, and for a plurality of sub-pixels connected to the same first channel wire, one part of the sub-pixels are located in one of the pixel areas, and another part of the sub-pixels are located in another one of the pixel areas.

10. A display panel, comprising:

a plurality of data lines, wherein the plurality of data lines are arranged at intervals along a first direction; and a first demultiplexer, wherein the first demultiplexer comprises a first control unit and a first channel wire, an extending direction of the first channel wire and an extending direction of the data lines are same, the first channel wire is connected to at least two of the data lines, the first control unit comprises a plurality of first switching elements, one of the at least two data lines sharing the same first channel wire is connected to the first channel wire through M first switching elements connected in parallel, and M≥2;

wherein the display panel further comprises a display area, and the first control unit is disposed in the display area;

wherein the display panel further comprises a plurality of touch wires, the plurality of touch wires are arranged at intervals along the first direction; and wherein the display panel further comprises a second demultiplexer, the second demultiplexer comprises a plurality of second control units and a plurality of second channel wires, the plurality of second channel wires are arranged at intervals along the first direction, each of the second channel wires is connected to at least two of the touch wires, each of the second control units comprises a plurality of second switching elements, one of the at least two touch wires sharing a same second channel wire is connected to one of the second channel wires through corresponding one of the second switching elements, and the second control units are arranged in the display area.

11. The display panel according to claim 10, wherein the display area comprises a first display area and a second display area along the extending direction of the data lines, the first demultiplexer is disposed in the second display area, the second demultiplexer is disposed in the first display area and the second display area, in the second display area, the first switching elements are disposed in one of odd-numbered rows of sub-pixels and even-numbered rows of the sub-pixels, and the second switching elements are disposed in another one of the odd-numbered rows of the sub-pixels and the even-numbered rows of the sub-pixels.

12. The display panel according to claim 11, wherein the display panel further comprises a plurality of columns of sub-pixels, and each of the columns of sub-pixels is correspondingly provided with one of the data lines; and along the first direction, the first channel wire, the touch wires, and the second channel wires are respectively adjacent to different data lines.

13. The display panel according to claim 11, wherein the display panel further comprises a plurality of touch electrodes arranged in an array, each of the touch electrodes is connected to at least one touch wire, and/or each of the touch electrodes is correspondingly provided with one or more of the second channel wires.

14. The display panel according to claim 13, wherein in the first display area, each of the touch electrodes is provided with two of the second channel wires, and in the second display area, each of the touch electrodes is provided with four of the second channel wires.

15. The display panel according to claim 10, wherein the display panel further comprises a plurality of touch electrodes arranged in an array, each of the touch electrodes is connected to one or more of the touch wires, and the touch electrodes are served as common electrodes; and wherein the display panel further comprises a plurality of third channel wires, the plurality of third channel wires are arranged at intervals along the first direction, and each of the third channel wires is connected to a corresponding one of the touch wires.

16. The display panel according to claim 15, wherein the display panel further comprises a third demultiplexer, the third demultiplexer comprises a plurality of third control units, each of the third channel wires is connected to at least two of the touch wires, each of the third control units comprises a plurality of third switching elements, one of the at least two touch wires sharing a same one of the third channel wires is connected to one of the third channel wires through corresponding one or more of the third switching elements, and the third control unit are disposed in the display area.

17. The display panel according to claim 16, wherein along the extending direction of the data lines, each of the touch electrodes comprises a first part and a second part connected to each other, the second demultiplexer is disposed corresponding to the second part, and the third demultiplexer is disposed corresponding to the first part.

18. A display device, comprising a display panel and a drive chip, wherein the display panel comprises:
    a plurality of data lines, wherein the plurality of data lines are arranged at intervals along a first direction; and
    a first demultiplexer, wherein the first demultiplexer comprises a first control unit and a first channel wire, an extending direction of the first channel wire and an extending direction of the data lines are same, the first channel wire is connected to at least two of the data lines, the first control unit comprises a plurality of first switching elements, one of the at least two data lines sharing the same first channel wire is connected to the first channel wire through M first switching elements connected in parallel, and M≥2;
    wherein the display panel further comprises a display area, and the first control unit is disposed in the display area; and
    wherein data voltage polarities of the data lines connected to the same first channel wire are same; the display panel further comprises one pixel area, along the first direction, the pixel area comprises 2N columns of sub-pixels, the pixel area is provided with two of the first channel wires, each column of the 2N columns of sub-pixels is correspondingly provided with one of the data lines, and N is an integer greater than or equal to 2; and the data voltage polarities of two adjacent first channel wires are opposite, in the pixel area, a first one of the two adjacent first channel wires are respectively connected to odd-numbered data lines along the first direction, and a second one of the two adjacent first channel wires is respectively connected to even-numbered data lines;
    wherein the drive chip is connected to the first channel wire.

* * * * *